United States Patent Office 3,527,821
Patented Sept. 8, 1970

3,527,821
OLEFINIC HYDROCARBON STABILIZED BY SODIUM BOROHYDRIDE PARTICLES
Charles W. Montgomery, Oakmont, and Charles M. Selwitz, Pitcairn, Pa., assignors to Gulf Research & Development Company, Pittsburgh, Pa., a corporation of Delaware
No Drawing. Filed Jan. 16, 1968, Ser. No. 698,111
Int. Cl. C07c *7/18;* C09k *1/64;* C10g *9/16*
U.S. Cl. 260—666.5                                10 Claims

ABSTRACT OF THE DISCLOSURE

Discrete particles of sodium borohydride are suspended in olefinic hydrocarbons for destruction of olefinic hydroperoxide impurities.

---

This invention relates to the stabilization of olefinic hydrocarbons. More particularly, this invention relates to the stabilization of alpha olefinic hydrocarbons against the adverse effects of hydroperoxide impurities.

The polymerization of olefin monomers, such as ethylene, in the presence of an organometallic catalyst, such as triethyl aluminum, to produce normal alpha olefins having from four to about 40 carbon atoms is well known. The normal alpha olefins produced, particularly the $C_{12}$, $C_{14}$ and $C_{16}$ alpha olefins, are converted to alkyl chlorides and then used to alkylate benzene as a step in the production of detergents.

The alpha olefins are produced in an oxygen-free atmosphere and are recovered from the production process in a non-oxygenated condition. However, they are commonly stored outdoors in drums. Cyclic cooling and heating of the drums between daytime and night-time temperatures causes ingress and egress of air which reaches the olefins and causes hydroperoxide formation therein. The formation of hydroperoxides in the alpha olefins is autocatalytic so that the rate of hydroperoxide formation increases with the passage of time.

It is very difficult to remove these hydroperoxide contaminants. The hydroperoxides formed in the alpha olefins cannot be advantageously removed by distillation because under the elevated temperature conditions of distillation these peroxides are likely to catalyze polymerization of the alpha olefin medium in which they are present.

It is known that metal hydrides can be employed in the presence of solvents, such as organic polar solvents or water to reduce hydroperoxide or peroxide compounds that contain a hydroperoxide radical or peroxide radical which is attached to a carbon atom to which another oxygen atom is attached, i.e.,

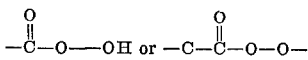

Thus, materials such as acetyl peroxide, benzoyl peroxide, peracetic acid, and the like have been reduced by the action of a metal hydride in solution, e.g. an aqueous solution of an alkali metal borohydride. Each of these compounds contains an oxygen atom connected to the carbon atom to which the hydroperoxide or peroxide group is attached as seen from the following structural formulas:

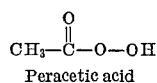
Peracetic acid $$CH_3-\overset{O}{\underset{\|}{C}}-O-O-\overset{O}{\underset{\|}{C}}-CH_3$$
Acetyl peroxide

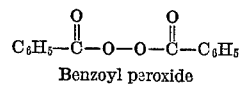
Benzoyl peroxide

It has been thought, based upon experimental evidence employing aqueous solutions of an alkali metal hydride, that peroxide compounds that contain a peroxide radical attached to a carbon atom to which no further oxygen atom is attached cannot be reduced by such metal hydrides. Thus, compounds such as ascaridole, dehydroergosterylacetate peroxide, and the like, have been considered to be nonreducible by such alkali metal hydrides. As seen from the following structural formulas, the peroxide radicals in these compounds are attached to carbon atoms to which no further oxygen atom is attached.

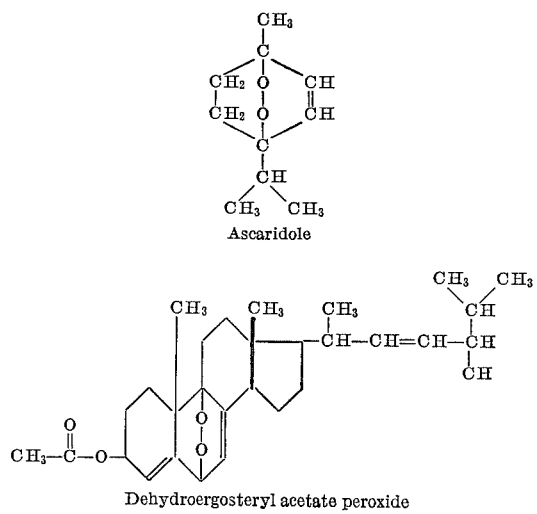

It has now been found that hydroperoxides which contain a hydroperoxide radical attached to a carbon atom to which no oxygen atom is attached, such as those which are formed by the action of air on olefinic hydrocarbons, can be reduced and olefinic hydrocarbons which are stabilized can be provided. According to the present invention a method is provided for the stabilization of olefinic hydrocarbons by incorporating an effective amount of finely divided sodium borohydride therein.

Surprisingly, it has been discovered that if the sodium borohydride is suspended in the olefinic hydrocarbon in the form of discrete particles rather than in a polar solvent or water, the olefinic hydroperoxide impurities can be effectively reduced. It was unexpected to find that sodium borohydride could be employed as the sole reducing agent without a solvent to reduce the hydroperoxides, since sodium borohydride, itself, is not even soluble in the olefinic hydrocarbon medium. The employment of the sodium borohydride in the form of particulate solids at least partially suspended in the olefinic hydrocarbon, is not only effective, but has the great advantage of avoiding the use of a solvent medium, which would only serve to contaminate the olefinic hydrocarbons. The presence of solvent media such as an organic polar solvent would destroy the usefulness of the olefinic hydrocarbon as a reactant in the preparation of detergents by the alkylation of benzene.

The reason that the finely divided sodium borohydride is able to reduce the olefinic hydroperoxides in the absence of a solvent for the borohydride, such as an organic polar solvent or water is not known, so that no attempt to explain the mechanism can be made. However, as previously noted, the fact that the sodium borohydride is not soluble in the olefinic hydrocarbons and can still reduce the hydroperoxides therein is even more surprising, since the sodium borohydride has been employed in solution in the past. The chemistry of the reaction which takes place can be illustrated by the following equation:

$$R\text{—}O\text{—}OH + NaBH_4 \rightarrow RONa + H_2O + \tfrac{1}{2}B_2H_6$$

wherein R represents an olefinic hydrocarbon moiety, particularly an alpha olefinic hydrocarbon moiety, such as that derived from the alpha olefins described above.

While the finely divided sodium borohydride will effectively destroy the hydroperoxides that are present in the olefinic hydrocarbons, it will not react with the olefins themselves in the process of the present invention. Thus, even at temperatures as high as 20° C., no reaction takes place between the olefins and the sodium borohydride suspended therein.

As previously mentioned, the sodium borohydride is employed in the form of discrete particles. This material is now commercially available, but may be produced, if desired, by any suitable method. For example, sodium borohydride may be synthesized by the following reaction employing temperatures in the range of 225° and 275° C.:

$$4NaH + B(OCH_3)_3 \rightarrow NaBH_4 + 3NaOCH_3$$

The particle size of the sodium borohydride that is employed in the process of the present invention may be varied over a wide range. However, suitable particle sizes include those in the range of between 2.5 and about 325 mesh, for example.

The concentration of the sodium borohydride may likewise be varied over a wide range, and any effective amount may be employed. For example, suitable amounts of the borohydride include between about 0.01 and about 10 percent by weight of the olefinic hydrocarbon, preferably between about .1 and about 5 percent by weight. By "effective amount" of sodium borohydride, it is intended to include those amounts of the borohydride which will reduce substantially all of the hydroperoxides present in the olefinic mixture. The "effective amount" can be easily determined experimentally.

The sodium borohydride will effectively reduce the hydroperoxides present in the olefins at a broad range of temperatures. Thus, the reducing action of this material is effective at temperatures ranging, for example, from below room temperature up to about 200° C. Temperatures in the range of between about 20° and about 200° C., preferably in the range of between 60° and 130° C., are quite suitable for the purposes of the present invention. The process of the present invention is therefore quite suitable for the stabilization of olefinic hydrocarbons which are stored in closed storage drums in the summer sun. In fact, the rate of hydroperoxide reduction actually increases with increases in temperature, so that it may be desired to enhance the effectiveness of the borohydride stabilizer by employing heated storage containers, tank cars, and the like.

Any olefinic hydrocarbon material may be stabilized by the process of the present invention. Thus, for example, the present method may be employed for the stabilization of olefinic hydrocarbons containing between about four and 40 carbon atoms per molecule and mixtures thereof. Examples of suitable olefinic hydrocarbons include 2-butenes, 2-pentenes, 3-hexene, 2-heptenes, 12-tetracosene, 4-methyl-2-pentene, cyclohexene, styrene, 1,5-hexadiene; 6-methyl-2-heptenes, 3-methylcyclopentene, 2,4,7-trimethyl-1-nonene and the like. However, it is preferred to treat alpha olefins. Thus, for example, the present method may be employed for the stabilization of alpha olefins containing between about four and about 40 carbon atoms per molecule and mixtures thereof. Examples of suitable alpha olefins include, 1-butene, 1-pentene, 1-hexene, 1-heptene, 1-octene, 2-methyl-1-pentene, 4-methyl-1-pentene, 4-methyl-1-hexene, 4-ethyl-1-hexene, 6-methyl-1-heptene, 5-methyl-1-heptene, 1-nonene, 1-decene, 1-tridocene, 1-nonadecene, 1-eicosene, 1-heptacosene and the like. It is especially preferred to treat alpha olefins containing between about 12 and about 16 carbon atoms per molecule.

The contact time between the finely divided sodium borohydride and the olefinic hydrocarbon may be, for example, in the range of between about 0.1 and about 10,000 hours or longer, preferably in the range of between about 1 and about 2400 hours. Any suitable reaction pressure may be employed. However, ordinary atmospheric pressures are quite suitable for present purposes.

The olefinic hydrocarbons may be admixed with the sodium borohydride in any suitable manner. Thus, the finely divided borohydride can be added in predetermined amounts to an agitated vessel, such as a stirred kettle or drum containing the olefinic mixture with continued agitation until a suspension of the borohydride is formed. Preferably, the sodium borohydride is admixed with the olefinic hydrocarbon before any hydroperoxide compounds have formed, so that the hydroperoxides can be destroyed as they are formed. Thus, the finely divided borohydride is preferably added to the olefinic material before it is placed in storage vessels, and the like. This mode of operation minimizes the autocatalytic formation of the hydroperoxides to the greatest extent. However, the borohydride may be added to the olefinic material after the hydroperoxides have formed to destroy hydroperoxides after their formation. If desired, an inert gas atmosphere may be employed during the admixture of the borohydride with the olefinic material in order to exclude oxygen and reduce the formation of hydroperoxides during this period. Thus, nitrogen, carbon dioxide or other inert gases may be employed under a slight pressure for this purpose.

A more complete understanding of the invention can be obtained by referring to the following examples which are for illustrative purposes only.

EXAMPLES 1-4

Auto-oxidized octene-1 having a peroxide number of 248 and containing about 3 percent octenyl hydroperoxide in the amount of 188 grams, is admixed with 3.8 grams of sodium borohydride. The mixture is stirred continuously under a nitrogen atmosphere.

After a period of two hours, a sample of the mixture is taken while at room temperature. The temperature of the mixture is raised to 60° C. and after two hours another sample is taken. The temperature is further raised to 120° and after two hours a sample is taken. The results obtained are set forth below in Table 1.

TABLE 1

| Example No. | Sodium borohydride | Time (hours) | Temperature (° C.) | Peroxide No. |
|---|---|---|---|---|
| 1 | No | 0 | 27 | 248 |
| 2 | Yes | 0-2 | 27 | 75 |
| 3 | Yes | 2-4 | 60 | 25 |
| 4 | Yes | 4-6 | 120 | <0.2 |

The peroxide content of the various samples is measured by reacting a sample of the olefinic material with an alcoholic potassium iodide solution, and conducting a potentiometric titration of the liberated iodide with a standard sodium thiosulfate solution.

It will be noted from Table 1 that the peroxide number and therefore the hydroperoxide content of the alpha olefin is drastically reduced with an increase in temperature.

EXAMPLE 5

One hundred grams of hexene-1 having a peroxide number of 345 are refluxed at a temperature of 63° C. with 5 grams of sodium borohydride. The heating is continued for a period of four hours. The peroxide number is reduced to 35.

EXAMPLE 6

Three hundred grams of a mixture of $C_{12}$ to $C_{16}$ alpha olefins having a peroxide number of 300 are admixed with 6 grams of finely divided sodium borohydride for a period of about 3 hours. The temperature of mixing is about 120° C. This treatment reduces the peroxide number of the mixture to below 0.1.

EXAMPLE 7

A quantity of the $C_{12}$ to $C_{16}$ stabilized alpha olefinic mixture that is produced according to Example 6, is reacted with hydrogen chloride and is thereby converted to the corresponding alkyl chlorides.

The alkyl chlorides are then reacted with benzene under alkylation conditions and with a suitable alkylation catalyst to form linear alkyl benzene. A high quality alkylated product is produced and is successfully employed in the production of detergents.

EXAMPLE 8

A twenty gallon storage tank is filled with a $C_{14}$ to $C_{16}$ alpha olefinic hydrocarbon mixture that is produced by the polymerization of ethylene employing a triethyl aluminum catalyst. The storage tank is maintained at a temperature of 30° C. for a period of seventy (70) days. At the end of this period of time, the contents of the vessel are analyzed and it is found that some peroxide formation and polymerization of the alpha olefinic mixture has occurred, presumably due to the autocatalytic formation of hydroperoxide impurities therein.

EXAMPLE 9

The procedure of Example 8, is repeated, except that 4 percent by weight of finely divided sodium borohydride is added to the olefinic mixture, with stirring, prior to placing the olefins into the tank.

After seventy (70) days of storage at 30° C., the contents of the tank are inspected and analysis indicates that no peroxide formation nor polymerization of the alpha olefins has taken place.

Thus, it is seen that the incorporation of the finely divided sodium borohydride into olefinic hydrocarbons according to the process of the present invention results in a stabilized olefinic composition that may be stored without the autocatalytic formation of peroxides due to reaction of the olefins with air. Furthermore, the suspension of the borohydride in the olefins in the form of discrete particles and in the absence of a contaminating solvent permits the recovery of a high quality olefinic material that is suitable for industrial applications, e.g., detergent production.

Obviously, many modifications and variations of the invention as hereinabove set forth can be made without departing from the spirit and scope thereof; and therefore only such limitations should be imposed as are indicated in the appended claims.

We claim:

1. A method for the stabilization of an olefinic hydrocarbon by the destruction of olefinic hydroperoxide contaminants, which comprises admixing said olefinic hydrocarbon with an effective amount of discrete particles of sodium borohydride in the substantial absence of a solvent for said sodium borohydride.

2. The method of claim 1 wherein the olefinic hydrocarbon is an alpha olefin.

3. The method of claim 2 wherein the alpha olefin contains between 4 and 40 carbon atoms.

4. The method of claim 1 wherein the resulting admixture is employed at temperatures in the range of between about room temperature and 200° C.

5. The method of claim 1 wherein the admixture is conducted in the presence of an inert atmosphere.

6. The method of claim 1 wherein the hydroperoxides contain a hydroperoxide radical attached to an olefinic hydrocarbon moiety.

7. The method of claim 6 wherein the olefinic hydrocarbon moiety is an alpha olefinic moiety.

8. A stabilized composition of matter consisting essentially of an olefinic hydrocarbon containing discrete particles of sodium borohydride suspended therein.

9. A composition of matter as defined in claim 8 wherein the olefinic hydrocarbon is an alpha olefin.

10. A composition of matter as defined in claim 9 wherein the alpha olefin contains between 12 and 16 carbon atoms per molecule.

References Cited

UNITED STATES PATENTS

| | | | |
|---|---|---|---|
| 2,867,651 | 1/1959 | Wise | 252—188 X |
| 2,967,897 | 1/1961 | Sharp et al. | 260—681 |
| 3,373,174 | 3/1968 | Hammerberg et al. | 260—701 X |
| 3,420,906 | 1/1969 | Singleterry | 260—666.5 |

OTHER REFERENCES

Encyclopedia (I), "Peroxides and Peroxy Compounds, Organic" by Mageli & Sheppard, pp. 766–820, Kirk-Othmer ECT, vol. 14 (1967).

Book, "Organic Peroxides," by A. G. Davis, Butterwork & Co. Ltd., London (1961).

Encyclopedia (II), "Metal Hydrides," by Gaylord and Banus, pp. 494–519, Kirk-Othmer ECT, First Supp., (1956).

Encyclopedia (III), "Borohydrides," by Hinckley, pp. 210–217, vol. 11 (1967).

Matic and Sutton: "Reduction of Tetralyl Peroxide with Sodium Borohydride," Chem. & Ind., London, 1953, p. 666.

DELBERT E. GANTZ, Primary Examiner

G. E. SCHMITKONS, Assistant Examiner

U.S. Cl. X.R.

252—188; 260—683.3

UNITED STATES PATENT OFFICE
CERTIFICATE OF CORRECTION

Patent No. 3,527,821 September 8, 1970

Charles W. Montgomery et al.

It is certified that error appears in the above identified patent and that said Letters Patent are hereby corrected as shown below:

Column 2, line 31, in the terminal group at the bottom of the chain "$\overset{|}{C}H$" should read -- $\overset{|}{C}H_3$ --. Column 3, line 14, "20° C." should read -- 200° C. --.

Signed and sealed this 5th day of January 1971.

(SEAL)
Attest:

Edward M. Fletcher, Jr.
Attesting Officer

WILLIAM E. SCHUYLER, JR.
Commissioner of Patents